(12) United States Patent
Guillott et al.

(10) Patent No.: US 7,808,757 B2
(45) Date of Patent: Oct. 5, 2010

(54) POWER SWITCHING APPARATUS WITH OVERLOAD PROTECTION

(75) Inventors: Laurent Guillott, Seysses (FR); Philippe Rosado, Fonsorbes (FR); Pierre Turpin, Toulouse (FR); Francoise Vareilhias, Toulouse (FR); Uli Joos, Nonnenhorn (DE); Josef Schnell, Wasserburg (DE)

(73) Assignee: Freescale Semiconductor, Inc., Austin, TX (US)

( * ) Notice: Subject to any disclaimer, the term of this patent is extended or adjusted under 35 U.S.C. 154(b) by 531 days.

(21) Appl. No.: 11/576,135

(22) PCT Filed: Sep. 28, 2004

(86) PCT No.: PCT/EP2004/014895
§ 371 (c)(1), (2), (4) Date: Mar. 27, 2007

(87) PCT Pub. No.: WO2006/034730
PCT Pub. Date: Apr. 6, 2006

(65) Prior Publication Data
US 2008/0055807 A1 Mar. 6, 2008

(51) Int. Cl.
*H02H 3/093* (2006.01)
(52) U.S. Cl. .................................................. 361/93.1
(58) Field of Classification Search ................ 361/93.1
See application file for complete search history.

(56) References Cited

U.S. PATENT DOCUMENTS

| | | | |
|---|---|---|---|
| 4,984,124 A * | 1/1991 | Yeh | 361/59 |
| 5,438,286 A | 8/1995 | Pavlin et al. | |
| 5,502,610 A * | 3/1996 | Chaney | 361/18 |
| 5,648,887 A * | 7/1997 | Herndon et al. | 361/31 |
| 5,774,321 A | 6/1998 | Kim et al. | |
| 6,865,063 B2 * | 3/2005 | Ball | 361/93.9 |

(Continued)

FOREIGN PATENT DOCUMENTS

DE    19737628 C1    1/1999

(Continued)

*Primary Examiner*—Jared J Fureman
*Assistant Examiner*—Ann T Hoang

(57) ABSTRACT

Power supply apparatus with overload protection comprising a switch responsive to an input signal for switching between an ON-state for supplying current from a source of power to a load and an OFF-state for interrupting the supply of current to the load, and protection means responsive to an overload condition to switch the switch to the OFF-state. The protection means is responsive to a first overload condition during an initial phase after the switch switches to the ON-state so as to switch the switch back to the OFF-state and maintain the switch in the OFF-state. The protection means is subsequently responsive to a second overload condition if the first overload condition is not detected during the initial phase so as to switch the switch to the OFF-state and subsequently switch the switch back to the ON-state after an interval of time.

The protection means is responsive to the current exceeding a first threshold value in detecting the first overload condition, and is responsive to the current exceeding a second threshold value in detecting the second overload condition, the second threshold value being lower than the first threshold value. The protection means is responsive to a temperature of the switch means exceeding a temperature threshold value in detecting at least the first overload condition.

16 Claims, 4 Drawing Sheets

U.S. PATENT DOCUMENTS

2002/0105769 A1    8/2002    Sato et al.

FOREIGN PATENT DOCUMENTS

| | | |
|---|---|---|
| DE | 19705339 C2 | 11/2001 |
| EP | 0404692 B1 | 8/1993 |
| EP | 0493238 B1 | 6/1995 |
| EP | 0945950 B1 | 7/2003 |
| EP | 0743529 B1 | 7/2004 |
| JP | 01301432 | 5/1989 |
| JP | 03293814 | 12/1991 |

* cited by examiner

High resistive short-circuit:
overtemperature detection

POWER SWITCHING APPARATUS WITH OVERLOAD PROTECTION

FIELD OF THE INVENTION

This invention relates to power supply apparatus with overload protection and more particularly with capability for re-starting the supply if the overload is not excessive.

BACKGROUND OF THE INVENTION

Power supply apparatus with overload protection, referred to herein as a 'smart power switch', is used in many applications, including automotive equipment, especially to control vehicle lighting, for example. The present invention is particularly, but not exclusively, usable in such applications.

Smart power switches are often required to include an automatic re-start capability, that is to say, for re-starting the switch if the overload is not excessive. In operation, the smart power switch switches itself to the OFF-state in response to an overload. If the overload is not excessive in duration and magnitude so that it is not dangerous for the switch itself or for the wiring and other system components, the smart power switch automatically turns itself to the ON-state again after a short interval, providing the opportunity to recover full power if the overload was sporadic or transient, and providing a degree of emergency power if the cause of the overload condition persists.

Integrated smart power switches may use various protection strategies in response to an overload condition, taking account of the characteristics of switching a capacitive load or an incandescent bulb, for example, both of which exhibit a high initial current 'inrush' before the current then settles to a lower steady magnitude.

One common strategy is an over-temperature shutdown, which protects the switch in case of high power dissipation in the switch, especially at high ambient temperatures. A problem encountered with this strategy is that it does not protect against a possible moderately high permanent junction temperature which degrades and finally destroys the semiconductor switch.

Another protection strategy uses a linear current limitation which limits the switch current to safe values. This strategy introduces a high amount of power dissipation in the switch during the turn-on phase of a capacitive load or a incandescent bulb. Therefore the switch must be deactivated by a supervising intelligence in case of overload (e.g. output short-circuit) to prevent it from destruction.

Yet another protection strategy uses an over-current shutdown feature with one or more current levels dependent on the load type. In case of a serious or a sporadic failure condition the switch is deactivated by the over-current shutdown feature. Therefore an intelligent control unit, such as a micro-controller is necessary to supervise the switch and reactivate the switch only in case of a sporadic failure condition to provide high availability of the output.

All these protection strategies suffer from the problem that the supervising intelligence of a micro-controller is necessary to provide both a high availability of the switch and also protect the switch. In case of failure of this micro-controller the switch is no longer safe and can be destroyed by an overload condition. Also, such an intelligent control unit is expensive.

SUMMARY OF THE INVENTION

The present invention provides power supply apparatus with overload protection as described in the accompanying claims.

DETAILED DESCRIPTION OF THE PREFERRED EMBODIMENTS

Figure 1:
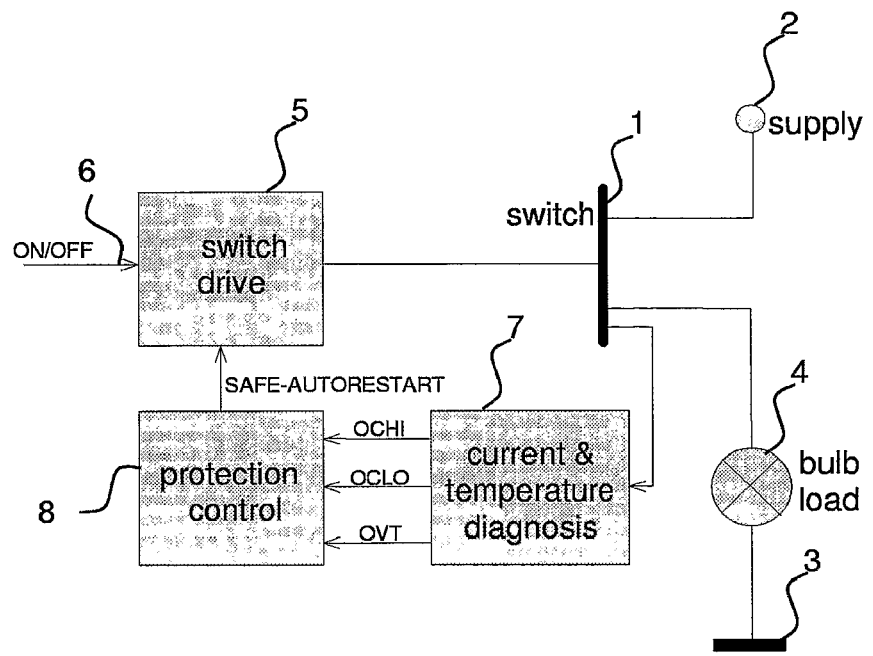
FIG. 1 is a block schematic diagram of a smart power switch in accordance with one embodiment of the invention, given by way of example.

The smart power switch apparatus shown in FIG. 1 of the drawings comprises a switch 1 for switching current supplied by a source of power (not shown), such as an accumulator and alternator in the case of an automotive application, connected to a power supply terminal 2 to a load 4 connected in series with the switch 1 between the terminal 2 and ground 3. The switch 1 preferably takes the form of a metal-oxide field-effect transistor ('MOSFET').

The switch 1 is switched between its ON and OFF states by a driver 5 in response to an input signal at an input 6. A current and temperature detection unit 7 detects the current flowing in the switch 1 and the load 4 and also the operating temperature of the switch 1. The detection circuit 7 provides overload signals OCHI, OCLO and OVT to a protection control unit 8 that are asserted if the relevant parameters exceed respective thresholds. The protection control unit 8 controls the switch 1 through the driver 5 and is capable of overriding the input signal at 6 in the event of an overload condition by causing the driver to switch the switch 1 to the OFF-state.

The input signal at 6 may be provided by a micro-processor offering additional lighting control functions, for example. However, it is important that the smart power switch shown in FIG. 1 is capable of functioning with overload protection even in the event of failure of the micro-processor in response to simple ON/OFF input signals.

Figure 2:
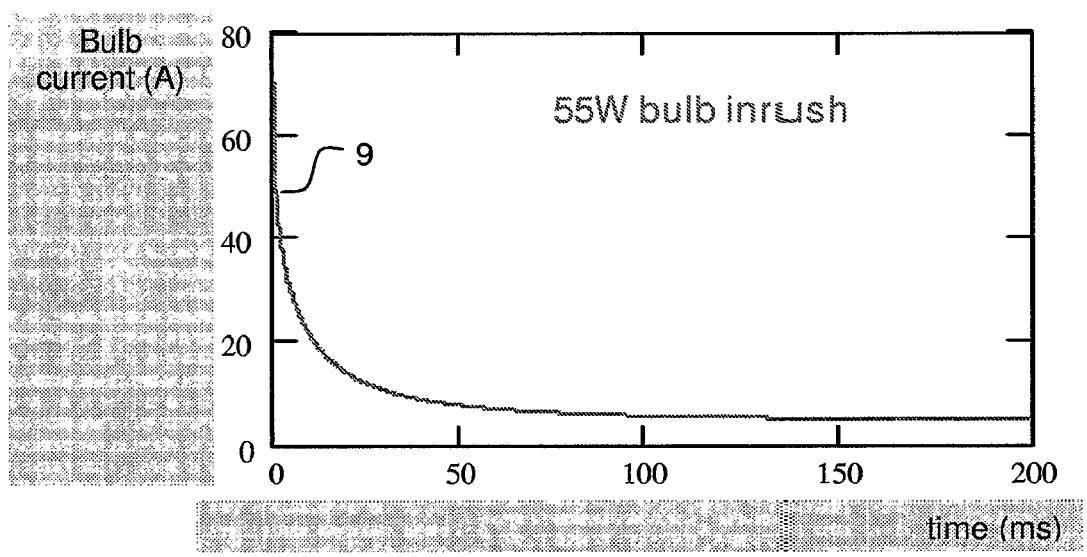
FIG. 2 is a graph of current as a function of time in a typical load switched by the switch of FIG. 1.
Figure 3:
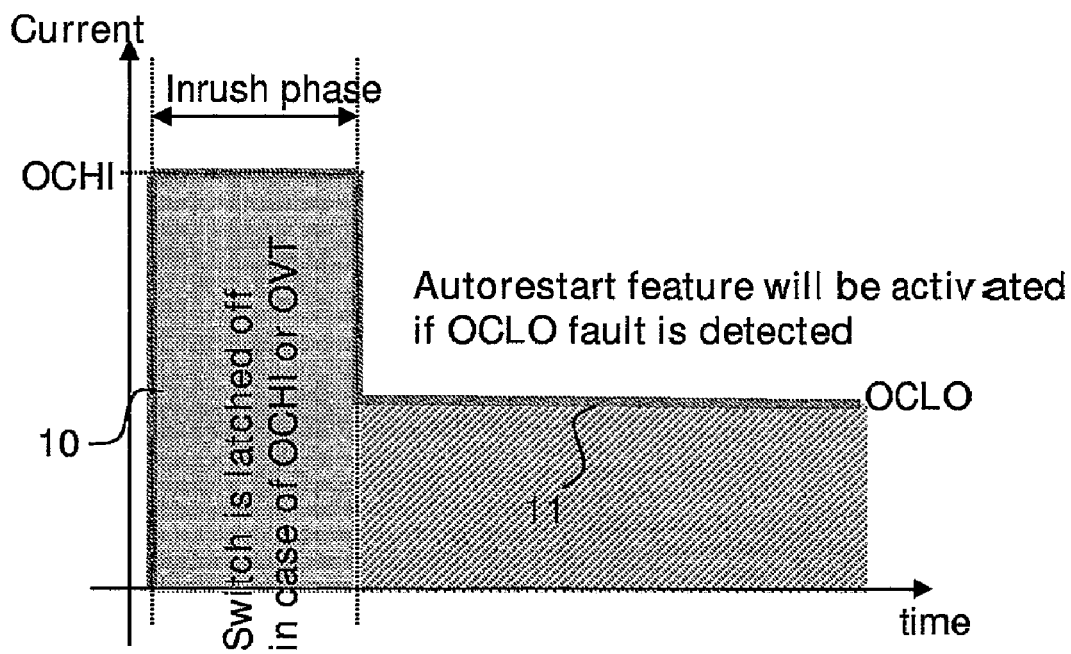
FIG. 3 is a graph of overload protection thresholds as a function of time in the switch of FIG. 1.

A capacitive load or an incandescent bulb both exhibit a high initial current 'inrush' when the load current is switched ON before the current then settles to a lower steady magnitude. This is illustrated for the case of a 55 watt incandescent bulb in FIG. 2 and it will be seen that the peak current 9 during the first tens of milliseconds reaches an order of magnitude higher than the steady state current. To the extent that this inrush current is of short duration, it will not damage the power supply system or the bulb.

Figure 4:
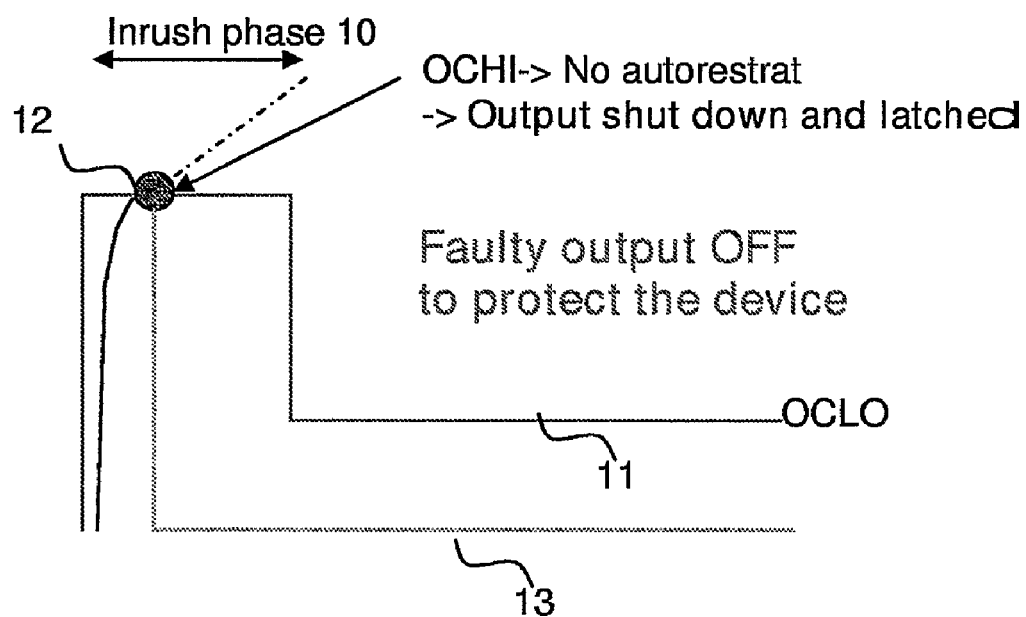
FIG. 4 is a graph of overload protection thresholds and load current as a function of time in the switch of FIG. 1 in the case of a severe short-circuit during an initial protection phase.
Figure 5:
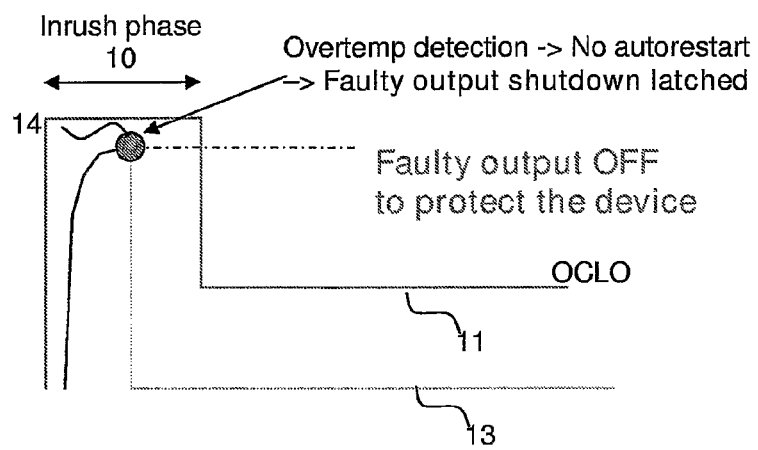
FIG. 5 is a graph of overload protection thresholds and load current as a function of time in the switch of FIG. 1 in the case of a resistive short-circuit during the initial protection phase.

In operation of the smart power supply of FIG. 1, as shown in FIG. 4, the protection control unit 8 is responsive to assertion of the overload signals OCHI and/or OVT, indicative of a first overload condition during an initial phase 10 after the switch 1 switches to the ON-state, so as to switch the switch means back to the OFF-state and then maintain the switch means in the OFF-state by latching the driver 5. In particular, as shown in FIG. 4, if the load current reaches a first threshold during the initial phase 10 that is abnormal even for the inrush current, as shown at 12, the overload signal OCHI is asserted and the switch 1 is turned permanently OFF as shown at 13. Moreover, as shown in FIG. 5, if the temperature reaches an overheating threshold at any time, even if the load current does not reach the overload threshold value even during the initial phase, as shown at 14, the switch 1 is turned permanently OFF as shown at 13.

However, if the initial protection phase is passed successfully without detection of an overload condition triggering overload protection, the protection control unit 8 is subsequently responsive to assertion of the overload signal OCLO so as to switch the switch 1 to the OFF-state and subsequently switch the switch 1 back to the ON-state after an interval of time. This function constitutes an automatic re-start attempt.

Figure 6:
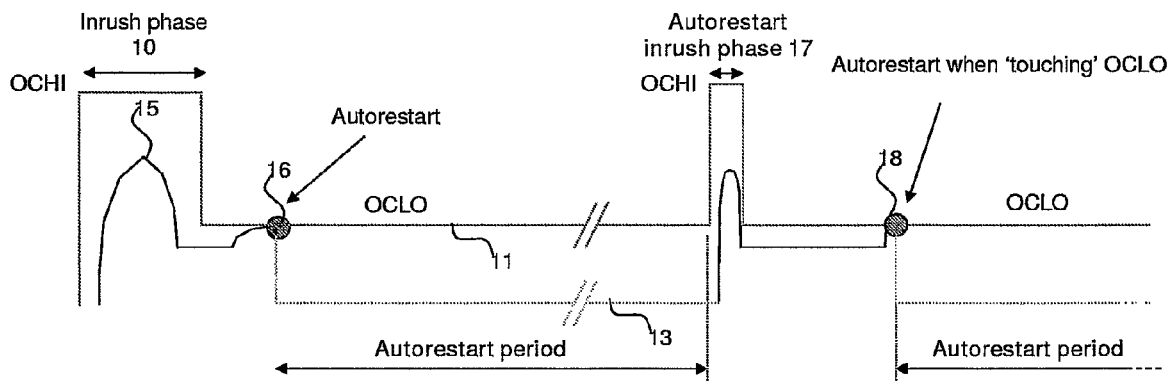
FIG. 6 is a graph of overload protection thresholds and load current as a function of time in the switch of FIG. 1 in the case of a resistive overload during a subsequent protection phase.

The overload threshold that triggers the overload signal OCLO is substantially less than the overload threshold that triggers the overload signal OCHI and therefore protects the system against overloads that are less than the inrush current but would be dangerous for the system if they lasted substantially longer. However, the overload threshold that triggers the overload signal OCLO is arranged not to limit the current carrying capacity of the smart power switch by imposing an unduly low maximum steady state current. As shown in FIG. 6, during the initial phase 10 a normal inrush current reaches peak levels that remain lower than the threshold that would trigger the overload signal OCHI, as shown at 15. However, if the steady state current subsequently reaches a threshold that triggers the overload signal OCLO, as shown at 16, the detection unit 7 asserts the overload signal OCLO and the protection control unit 8 switches the switch 1 to the OFF-state.

When the protection control unit 8 switches the switch 1 back to the ON-state after the automatic re-start time interval, the same protection cycle of an initial phase 17 responsive to OCHI followed by a phase responsive to OCLO as at 18 is repeated. However, the inrush period of the bulb is shorter than at the cold switch ON if the re-start interval is short enough for the bulb to remain warm, and so the initial phase 17 on re-start is shorter than the first initial phase 10.

Even if the initial protection phases 10 and 17 are passed successfully without detection of an overload condition triggering overload protection, assertion of the overload signal OVT, indicating detection of an excessive operating temperature causes the protection control unit 8 to turn the switch 1 OFF and maintain it OFF until the junction temperature is reaching the restart temperature (hysteresis).

Figure 7:
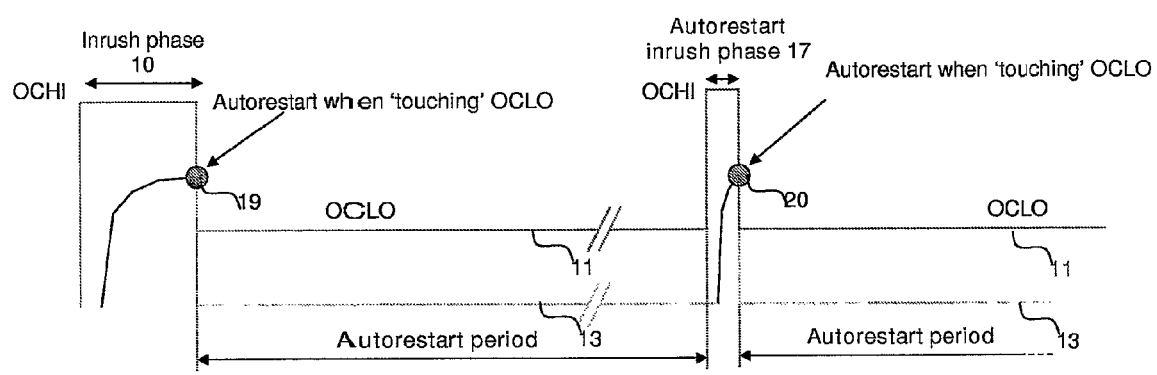
FIG. 7 is a graph of overload protection thresholds and load current as a function of time in the switch of FIG. 1 in the case of a resistive overload during the initial protection phase.

Moreover, as shown in FIG. 7, if the current inrush duration is longer than the initial period 10 or 17 without triggering OCHI, as shown at 19 and 20, the overload signal OCLO is asserted immediately at the end of the initial phase, triggering turning the switch 1 OFF followed by automatic re-start attempts.

This automatic re-start feature functions without requiring an external micro-processor and therefore provides power supply and protection functionality even in the presence of a micro-processor defect. In particular, in the event of a sporadic fault, the full performance of the current supply can be recovered while the fault is absent. Even if the fault is continuous reduced performance can be provided if the overload is moderate, the protection control unit 8 repeatedly turning the switch 1 OFF but then back ON again. The duty cycle of the autorestart mode is controlled to a sufficiently low value (for example 5%) to either limit the power dissipation in the switch during the automatic re-start mode and also to deliver enough energy to restart the bulb after removing the fault condition. Accordingly it is not necessary to limit the number of automatic re-start attempts.

The invention claimed is:

1. Power supply apparatus with overload protection comprising:

switch means responsive to an input signal for switching between an ON-state for supplying current from a source of power to a load and an OFF-state for interrupting the supply of current to the load; and protection means responsive to an overload condition to switch said switch means to said OFF-state;

wherein said protection means is responsive to a first overload condition during an initial phase of a predetermined duration after said switch means switches to said ON-state so as to switch said switch means back to said OFF-state and maintain said switch means in said OFF-state, and is subsequently responsive to a second overload condition if said first overload condition is not detected during said initial phase so as to switch said switch means to said OFF-state and subsequently switch said switch means back to said ON-state after an interval of time;

wherein said protection means is again responsive to said first overload condition during a further phase of a predetermined duration when said switch means switches back to said ON-state after said interval of time so as to switch said switch means back to said OFF-state and maintain said switch means in said OFF-state, said further phase having a shorter duration than said initial phase.

2. Power supply apparatus as claimed in claim 1, wherein said protection means is responsive to said current exceeding a first threshold value in detecting said first overload condition and is responsive to said current exceeding a second threshold value in detecting said second overload condition said second threshold value being lower than said first threshold value.

3. Power supply apparatus as claimed in claim 2, wherein said protection means is responsive to a temperature of said switch means exceeding a temperature threshold value in detecting at least said first overload condition.

4. Power supply apparatus as claimed in claim 1, wherein said protection means is responsive to a temperature of said switch means exceeding a temperature threshold value in detecting at least said first overload condition.

5. Power supply apparatus with overload protection comprising:

a switch responsive to an input signal for switching between an ON-state for supplying current from a source of power to a load and an OFF-state for interrupting the supply of current to the load; and a protection circuit responsive to an overload condition to switch said switch to said OFF-state;

wherein said protection circuit is responsive to a first overload condition during an initial phase of a predetermined duration after said switch switches to said ON-state so as to switch said switch back to said OFF-state and maintain said switch in said OFF-state, and is subsequently responsive to a second overload condition if said first overload condition is not detected during said initial phase so as to switch said switch to said OFF-state and subsequently switch said switch back to said ON-state after an interval of time; and wherein said protection circuit is again responsive to said first overload condition during a further phase when said switch switches back to said ON-state after said interval of time so as to switch said switch back to said OFF-state and maintain said switch in said OFF-state, said further phase having a shorter duration than said initial phase.

6. Power supply apparatus as claimed in claim 5, wherein said protection circuit is responsive to said current exceeding a first threshold value in detecting said first overload condition, and is responsive to said current exceeding a second threshold value in detecting said second overload condition, said second threshold value being lower than said first threshold value.

7. Power supply apparatus as claimed in claim 6, wherein said protection circuit is responsive to a temperature of said switch exceeding a temperature threshold value in detecting at least said first overload condition.

8. Power supply apparatus as claimed in claim 5, wherein said protection circuit is responsive to a temperature of said switch exceeding a first temperature threshold value in detecting at least said first overload condition.

9. Power supply apparatus as claimed in claim 8, wherein said protection circuit is responsive to a temperature of said switch exceeding a second temperature threshold value in detecting at least said second overload condition, said second temperature threshold value being lower than said first temperature threshold value.

10. The power supply apparatus of claim 5, when the protection circuit includes a temperature and current detection circuit.

11. The power supply apparatus of claim 10, when the temperature and current detection circuit detects current flowing in the switch and the operating temperature of the switch.

12. A method comprising:
providing a power supply apparatus comprising a switch responsive to an input signal for switching between an ON-state for supplying current from a source of power to a load and an OFF-state for interrupting the supply of current to the load, and comprising a protection circuit responsive to an overload condition to switch said switch to said OFF-state;

responsive to a first overload condition during an initial phase of a predetermined duration after said switch switches to said ON-state, operating said protection circuit so as to switch said switch back to said OFF-state and maintain said switch in said OFF-state; and subsequently responsive to a second overload condition if said first overload condition is not detected during said initial phase, operating the protection circuit so as to switch said switch to said OFF-state and subsequently switch said switch back to said ON-state after an interval of time;

again responsive to said first overload condition during a further phase of a predetermined duration when said switch switches back to said ON-state after said interval of time, operating said protection circuit so as to switch said switch back to said OFF-state and maintain said switch in said OFF-state, said further phase having a shorter duration than said initial phase.

13. The method as claimed in claim 12, wherein said protection circuit is responsive to a temperature of said switch exceeding a temperature threshold value in detecting at least said first overload condition.

14. The method as claimed in claim 12, further comprising:
detecting said first overload condition responsive to a temperature of said switch exceeding a first temperature threshold value.

15. The method as claimed in claim 14, further comprising:
detecting said second overload condition responsive to a temperature of said switch exceeding a second temperature threshold value, the second temperature threshold value being lower than the first temperature threshold value.

16. The method as claimed in claim 12, further comprising:
detecting said first overload condition responsive to said current exceeding a first threshold value; and
detecting said second overload condition responsive to said current exceeding a second threshold value, said second threshold value being lower than said first threshold value.

* * * * *